United States Patent [19]

Helferich et al.

[11] Patent Number: 4,812,424

[45] Date of Patent: Mar. 14, 1989

[54] KILN FURNITURE FOR THE FIRING OF CERAMIC ARTICLES

[75] Inventors: Richard L. Helferich, Clayton; Robert C. Schenck, Kettering, both of Ohio

[73] Assignee: The Duriron Company, Inc., Dayton, Ohio

[21] Appl. No.: 127,808

[22] Filed: Dec. 2, 1987

[51] Int. Cl.$^4$ .................. C04B 35/18; C04B 38/10; C04B 41/53; C04B 41/91

[52] U.S. Cl. ................... 501/84; 501/125; 501/128; 106/75; 106/84; 252/315.5; 423/181; 423/203; 264/42; 264/48; 428/312.4; 428/316.6; 428/318.8; 428/689; 428/697

[58] Field of Search ............ 106/75, 84; 501/84, 501/125, 128; 252/315.5; 423/181, 203; 264/42, 48; 428/312.4, 316.6, 318.8, 689, 697

[56] References Cited

U.S. PATENT DOCUMENTS

| | | | |
|---|---|---|---|
| 1,638,849 | 8/1927 | Hauerstick | 106/84 |
| 1,638,888 | 8/1927 | Slepian | 106/84 |
| 1,682,675 | 8/1928 | Horsfield | 264/43 X |
| 1,761,108 | 6/1930 | Desmarquest | 264/43 |
| 1,842,186 | 1/1932 | McBerty | 264/43 |
| 1,880,157 | 9/1932 | Setterberg | 264/43 |
| 2,216,251 | 10/1940 | Quisling | 106/75 |
| 3,322,667 | 6/1943 | Seastone et al. | 106/84 |
| 3,419,495 | 12/1968 | Weldes et al. | 106/84 |
| 3,700,470 | 10/1972 | Barton | 106/75 |
| 3,762,935 | 10/1973 | Leach | 264/43 X |
| 3,855,393 | 12/1974 | Rao | 106/75 |
| 4,059,658 | 11/1977 | Shoup et al. | 264/43 |
| 4,071,369 | 1/1978 | Kurz et al. | 264/43 X |
| 4,133,691 | 1/1979 | Kindt et aL. | 106/75 |
| 4,217,240 | 8/1980 | Bergna | 502/263 |
| 4,356,271 | 10/1982 | Francis et al. | 264/43 X |
| 4,357,165 | 11/1982 | Helferich et al. | 106/84 X |
| 4,432,798 | 2/1984 | Helferich et al. | 106/84 X |
| 4,568,595 | 2/1986 | Morris | 428/65 |
| 4,721,696 | 1/1988 | Kidd | 502/263 X |

Primary Examiner—William R. Dixon, Jr.
Assistant Examiner—David M. Brunsman
Attorney, Agent, or Firm—St. Onge Steward Johnston & Reens

[57] ABSTRACT

Low mass kiln furniture for supporting ceramic ware during the firing thereof is provided having excellent thermal shock resistance and high temperature stability, the kiln furniture being comprised of a porous refractory ceramic body of low density prepared by the firing of a porous aluminosilicate-bound aggregate of refractory ceramic compounds, and wherein the ceramic body has on one or more of its surfaces a smooth skin in the form of an integral thin porous ceramic membrane layer.

7 Claims, No Drawings

KILN FURNITURE FOR THE FIRING OF CERAMIC ARTICLES

BACKGROUND OF THE INVENTION

The present invention relates to kiln furniture and, more particularly, to low mass, porous refractory ceramic articles useful as kiln furniture.

Kiln furniture refers to the refractory shapes used to support ceramic ware during the firing process and includes shelves, contoured supports and spacers which are referred to in the industry as batts, setters (box, plate, yoke-ring) and the like. These refractory shapes must not only be able to withstand the high temperatures encountered in firing ceramics, but must also be strong enough to support the necessary load of the ceramic at firing temperature without deforming. Also of great importance, the kiln furniture must be reusable, a property demanding highly thermal shock resistant material.

Recent advances in high speed or fast-firing kilns in the ceramics industry have led to the possibility of improved economics in the manufacture of ceramic ware as a direct result of potential for fuel reduction during the firing cycle. In order to take maximum advantage of these potentially available process cost reductions, however, it is necessary to employ kiln furniture which is of low mass and yet which possesses extremely high thermal shock resistance in order to withstand the thermal cycling which characterizes the newer kiln designs and firing processes. Added to this is the need to provide kiln furniture of a variety of shapes and configurations as needs may dictate, as well as furniture having smooth surfaces suitable for supporting shapes to be fired into ceramics.

To date, a cost-effective kiln furniture article meeting all these requirements has not been realized.

SUMMARY OF THE INVENTION

According to the invention, there is provided a lost cost, low mass refractory article for use as kiln furniture which possesses the requisite thermal shock resistance and smooth surfaces. The article comprises a porous refractory ceramic article made by firing a supportable molded porous shape comprised of a porous, aluminosilicate-bound aggregate of refractory ceramic materials. The fired porous refractory article possesses smooth surfaces at predetermined surfaces thereof by reason of arrangement there of an integral thin porous ceramic membrane layer.

In the invention, a foamable ceramic composition containing refractory ceramic compounds, components which result in formation of an aluminosilicate hydrogel binder, and components which result in in situ generation of gas to achieve porosity and low density, is cast or injection-molded or extruded into a desired configuration, and in the mold or extrusion chamber foams and sets to a supportable porous shape in the desired configuration. Included in this process or shortly thereafter, steps preferably are taken to provide on selective surfaces a precursor of the eventually desired thin porous ceramic membrane in the fired article. Prior to firing, the supportable porous shape is treated to reduce the alkali metal content thereof so as to increase refractoriness in the fired article. Thereafter, the porous shape is fired to produce the low-mass, porous, refractory ceramic article preferably having on selected surfaces an integral thin porous ceramic membrane layer, these properties and features making the article ideally suited for use as kiln furniture.

The ability to utilize a moldable composition has the distinct advantage of permitting economic manufacture of kiln furniture of any desired size and shape. The particular composition itself is based upon low cost materials, thereby materially enhancing the economics of the process and ultimate product, yet nevertheless is capable of producing low-density, porous refractory ceramic articles having excellent resistance to thermal shock. For example, by virtue of rapid and economic techniques used for reducing the alkali metal content of the supportable porous shape, it is possible to use large amounts of low-cost alkali metal forms of compounds in the composition, while still producing a fired ceramic of low alkali metal content and, hence, increased refractoriness and thermal shock resistance. So too, by virtue of expedient and economic techniques for producing an integral and smooth thin porous ceramic membrane layer on selected surfaces of the article, articles especially suitable for kiln furniture are producible at low cost.

According to the present invention, there is provided a composition comprised of an admixture of an aluminosilicate hydrogel and suitable refractory ceramic materials, e.g., refractory oxides, carbides, nitrides, borides, silicides and the like such as alumina, chromia, zirconia, magnesia, titania, silica and mixtures thereof (either as admixtures per se or as part of the compound itself, e.g., mullite, cordierite, calcined kyanite and the like), silicon carbide, silicon nitride, boron carbide, boron nitride and the like. Also included as part of the composition are particulate metal, a surfactant system and a gel strengthening agent, preferably silica fume, these latter ingredients being present in essential yet relatively minor proportions relative to the hydrogel and ceramic components. In addition, refractory fibers may be included in the composition to attain yet additional strength in the eventual molded and fired ceramic.

The foregoing composition is described with reference to generally identifiable constituents of the composition at the time of its molding and setting, but the general process of preparing the composition utilizes more fundamental components which, upon admixture, result in the formation of the described hydrogel (i.e., rather than addition of the hydrogel as an identifiable separate ingredient). The hydrogel is formed from a water soluble source of silica and a water soluble source of alumina, and the remaining components of the castable composition (e.g., refractory ceramic materials, surfactants, gel strengthening agent, metal powder, refractory fibers) can be added to or distributed between one or both of the aluminate or silicate compositions. Upon admixture of these two separately prepared and maintained aqueous compositions or slurries, there is formed an aluminosilicate hydrogel which serves to bind together all components of the composition. The hydrogel binder is self-setting at ambient conditions and is capable of setting and binding the composition to a generally self-supporting structure within a brief but controllable time.

According to this aspect of the present invention, the component parts of the moldable ceramic composition are admixed to form a moldable composition. Before any substantial self-setting of the composition occurs, it is poured or injected into a mold of suitable desired shape so as to assume the general configuration thereof, and/or extruded in the desired shape, taking into account the fact that the composition will foam and expand in the mold or extrusion chamber. During the self-setting reaction, additional reaction takes place within the composition in which the particulate metal reacts with alkali metal compounds in the composition to produce, inter alia, hydrogen gas. By arranging the self-setting hydrogel reaction to be of suitable duration, the cast composition increases in volume in the mold or chamber as a consequence of the internal gas generation and takes on a porous nature as the gas evolves within and from the composition. Then, as close as possible to the cessation of gas evolution, the in-situ hydrogel formation causes the composition to set in the desired porous configuration, i.e., with a porosity that is either predominantly open celled or predominantly closed celled.

The self-supporting structure formed in this manner requires further treatment in order to leach alkali metal therefrom so as to render the structure suitably refractory and thermal shock resistant for intended use in the high temperature and/or temperature cycling environments to which kiln furniture is exposed. Preferably this will be accomplished in a two step process involving rinsing of the part in water to remove excess alkali metal compounds therefrom, and then contacting the part with an ammonium salt solution, e.g., a dilute ammonium chloride ion exchange solution, whereby ammonium ions are exchanged for alkali metal ions. Thereafter, the structure is dried to remove water therefrom, and is then fired at suitable conditions to result in the ultimately-desired shaped porous ceramic kiln furniture article.

Porous ceramic articles made from these compositions preferably are arranged to possess a smooth thin ceramic membrane layer on all or parts of their surfaces by a number of process and/or compositional techniques, including the expedient of providing mold surfaces with ceramic paper prior to introduction into the mold of the castable composition, and the use of defoaming agents on selected mold surfaces to suppress foaming of the castable composition at those surfaces and arrive at controllably small size pores at those surfaces.

DETAILED DESCRIPTION OF THE INVENTION

The aluminosilicate hydrogel portion of the composition of the present invention is, in essential respects, as described in commonly-assigned U.S. Pat. Nos. 4,357,165 and 4,432,798, both of which are expressly incorporated herein by reference. As described in those patents, the hydrogel results from the admixture of water soluble sources of both silicate and aluminate (typically, sodium silicate and sodium aluminate), which admixture then self-sets at ambient temperatures in times which can be exceedingly short (e.g., on the order of as little as a few seconds but typically on the order of a few minutes), but nevertheless can be controlled by predetermined choice of molar ratio between aluminate and silicate, concentration of water, and temperature. The ability to exercise control over setting times for the hydrogel binder leads to important advantages with respect to attainment in the present invention of molded ceramic kiln furniture articles of both desired geometry and desired porosity. Also described in the above-noted patents is the utilization of the hydrogel components along with granular refractory particles to produce, e.g., molds, by virtue of the self-setting hydrogel serving to bind the granular materials into a self-supporting structure.

According to the present invention, the separately prepared and admixed components for forming the aluminosilicate hydrogel have added to them and/or distributed between them the remainder of the components which will make up the ceramic composition and the eventual fired porous ceramic shaped article. As earlier noted, the essential elements of this composition, besides the hydrogel-forming constituents, are refractory ceramic materials, particulate metal powder, a gel strengthening agent such as silica fume and a surfactant component, with refractory fibers or other conventional materials optional. The refractory ceramic materials generally will be present in the overall composition in a weight percentage of from about 50% to about 90%, preferably from about 60% to about 70%. In a preferred embodiment of the invention, the ceramic materials included in the composition will be chosen from cordierite, calcined kyanite and mixtures thereof, with most preferred compositions containing nearly equal weight proportions of both cordierite and calcined kyanite, e.g., from about 30 to 35% of each ceramic.

According to the invention, the requisite porosity in the final ceramic article to achieve low density kiln furniture is provided as a consequence of in situ reaction between metal powder and alkali compounds (e.g., sodium hydroxide) present in the composition, resulting in development of hydrogen gas as a reaction by-product. As a consequence of this internal gas production and evolution, the composition will expand in volume in the mold or extrusion chamber and develop porosity, the quantity of composition employed obviously being regulated to take into account the expected (and predetermined) degree of expansion within the mold or chamber to arrive at the desired final density and size of the article. At the same time, the surfactant present in the composition serves to break up the bubbles of evolving gas in the aqueous composition to achieve, controllably, suitably small bubbles and to dictate whether the porosity developed in the structure will be of the open-celled type or of the closed-cell type as may be desired.

The preferred particulate metal is aluminum, although other metals or metal alloys such as silicon or ferrosilicon which similarly will react with alkali compounds present in the composition to produce hydrogen gas also can be employed.

For most generalized compositions, the amount of surfactant and metal (e.g. aluminum) powder will be relatively small compared to the other components of the system, with the typical levels of addition of the surfactant being in the range of from about 0.05 to 1.0 percent by weight of the total composition and the metal powder being in the range of from about 0.05 to 0.5 percent by weight of the total composition. Preferred ranges of addition for these materials are 0.4 to 0.8 percent by weight for the surfactant (most preferably about 0.6%) and 0.1 to 0.2 percent by weight for the metal powder (most preferably about 0.15%), and a preferred ratio between the surfactant and metal powder is generally from about 2:1 to 8:1, most preferably about 4:1.

Among the preferred class of surfactants (which may be used alone or in combination) for use in the invention are the silicone glycols such as are available from the Dow Chemical Company for use in producing polyurethane foams. These surfactants have a stabilizing effect on the gaseous by-products produced and are available in a variety of customized formulations (based upon the silicone glycol chemistry) that are designed to control bubble (or cell) size as well as to control or dictate whether the cells are mostly open or mostly closed. For example, the surfactants from Dow Chemical known as DC 190, DC 198, Q2 5160 and Q2 5125, provide a mostly open cell structure in the present invention, while other surfactants from Dow Chemical, such as DC 193, DC 197, DC 5103 and DC 5098, provide a mostly closed cell structure in the present invention. In addition, still other Dow Chemical silicone glycol surfactants are available to further customize a foamed cell structure with a controlled or limited amount of cells opened, such as Q2 5243, DC 5043, Q2 5169, X2 5256, X2 5258 and Q2 5244. Although the silicone glycol type surfactants are preferred, a variety of other non-silicone surfactant types also may be employed, such as those available from Air Products & Chemicals, Inc. under tradename LK-221 and LK-443.

With respect to the aluminum or other particulate metal, the average particle size of the powder employed generally will be in the range of from about 1 to 44 $\mu m$, and preferably about 6–9 $\mu m$, with the understanding that the larger the surface area of the metal present in the composition, the more vigorous and extensive will be the foaming reaction.

Another essential ingredient of the composition of the invention is a gel strengthening agent, preferably silica fume, although other suitable agents may be employed. Silica fume is a by-product collected in the airstream during the reduction of silica sand by coal or coke in an arc furnace to make metallurgical-grade silicon metal. The particulates are hollow spheres, roughly 0.25 micron in diameter, composed of about 96% silica and having a light carbonaceous layer on their surface. Although the mechanism by which silica fume operates in the compositions of the invention is not entirely understood, its addition brings about a number of advantages, such as lowering the viscosity of the composition for a given solids content and reinforcing the gel network (without increasing viscosity) to give greater green strength. Without the presence of the silica fume, the hydrogel bonded aggregate structure appears more prone to cracking during drying operations. By reinforcing the gel structure, the silica fume reduces shrinkage as the article is dried. Generally, it has been found that the silica fume is effective at levels of from about 0.25 to about 10 percent by weight of the total composition, preferably from about 1 to 4 percent by weight, and most preferably from about 1 to 2% by weight.

As noted, gel strengthening agents other than silica fume can be employed, such as fly ash, manganese oxide fume, ferrosilicon fume and the like. Based upon experimentation to date, the chief characteristic required to be possessed by the gel strengthening agent is the small, spherical shape enabling it to react readily with the matrix binder and/or aggregate consttuents. tuents.

As earlier noted, the moldable ceramic composition may advantageously further comprise refractory ceramic fibers, such as Kaowool ™, Fiberfax ™ and Fiberkal ™ type aluminosilicate fibers, Saffil ™ alumina fibers, silicon carbide whiskers and calcium silicate fibers, to give further rigidity to the fired structure. Typically, these fibers can be present in an amount up to as much as about 60 percent by weight of the composition, but most typically are employed in amounts from about 1 to 4% by weight.

In the present invention, the components of the ceramic composition are selected to yield a particular setting time (e.g., by variation in aluminate/silicate ratio and/or solids content, and taking into account the temperature at which the composition will be molded or extruded), consistent with the anticipated duration of the foaming process in the mold or extrusion chamber. As noted earlier, a distinct advantage of the invention is that the setting time can be arranged to achieve a particular dimensionally stable degree of gelation at or very near the time when the gassing reaction ceases, thus insuring retention of the developed porosity in the eventually fired kiln furniture article. If gelation occurs too soon, the composition lacks the freedom to develop and accommodate the desired degree of porosity and/or may result in cracking of the set structure as gas continues to be evolved, while if gelation is delayed too long, the developed porosity will have a tendency to break down before the structure can be firmed up. While this latter problem might be curable by excess utilization of surfactant and/or metal powder, cure in this way may introduce into the article too substantial amounts of components making control more difficult and which may adversely affect final product characteristics.

As noted earlier, the presence of silica fume in the composition results in substantial reduction of the viscosity of the composition, the measured reduction being greater at higher spindle speeds on the measuring device and also greater with increasing amount of silica fume. The green strength (as measured by the modulus of rupture or MOR) of the shapes generally increases with increasing silica fume content. Increase in the amount of surfactant or increase in available surface area of metal powder (increase in amount or also, e.g., by using either a flaked metal powder or smaller grain size) increases the number of pores per linear inch in the molded product. Increase in slurry temperature or other means to decrease set time results in an increase in density of the cast product, while a decrease in the available surface area of metal powder also increases the density.

Following the removal of the molded porous ceramic shape from the mold or extrusion chamber, it is necessary to treat it to reduce or, ideally eliminate, alkali metal (e.g., sodium) therein prior to the firing process so as to avoid the formation in the fired kiln furniture article of glassy phases which would reduce the refractoriness or thermal shock stability of the kiln furniture. This may be accomplished by a number of techniques, but the most preferred is to contact the unfired porous shape with water to leach alkali metal compounds therefrom, and then to follow this with contact with a dilute aqueous solution of an ammonium salt such as ammonium chloride to effect substantially complete exchange of ammonium ion for any sodium ion remaining. A final rinse may then be employed to remove any residual chloride ion or other anion associated with the ammonium salt.

Once the final rinse is completed, the parts are allowed to drain and dry. Drying is further enhanced by heating the component in a vented oven (or microwave oven) to about 400°–600° F. At this time, the part is transferred to a high temperature kiln and heated to the required firing temperature to allow the formation of a more homogeneous aluminosilicate ceramic bond in the component microstructure with an associated increase in strength.

Thus, following removal of soluble alkali, the molded article is dried to remove water therefrom and is then fired in any suitable furnace at the temperatures required (e.g., 2200° F. to 2600° F.) to form the shaped porous ceramic kiln furniture article, a generally monolithic structure having porosity of th open-celled or closed-celled type. Depending upon the components of the composition and the processing conditions, sintered ceramic refractory kiln furniture articles can be prepared having a broad range of porosity.

A wide range of refractory foam compositions can be achieved using the basic procedures outlined above depending on the specific requirements of the final kiln furniture product. For example, if thermal shock resistance is of paramount importance, refractory compositions that result in low thermal expansion can be incorporated such as those containing lithium aluminosilicate, cordierite (a magnesium aluminosilicate) and/or aluminum titanate. In addition, if strength and toughness are more important, then such materials as mullite, zirconia-toughened ceramics and ceramic composites may be incorporated. If high thermal conductivity is important, then the use of silicon carbide or silicon nitride is recommended. If high refractoriness is important, pure alumina can be used. If long term durability is required in both thermal and mechanical shock conditions, then low expansion, strong and tough type systems will be utilized.

As noted earlier, the invention provides a porous ceramic kiln furniture element which, on one or more of its surfaces, is provided with thin porous ceramic membrane layer which serves as a smooth skin so as to provide a suitable support surface for supporting ceramic ware during firing and/or to provide a surface permitting the kiln furniture to be arranged suitably in the kiln. Pores in this skin. can be of open-cell or closed-cell type and can be in the form of spheres, cylindrical channels or the like, and have an average size (diameter) smaller than that of the pores within the kiln furniture article and at untreated surfaces.

A wide variety of means can be used for providing this membrane on the porous, refractory aluminosilicate-based ceramic kiln furniture element according to the invention.

In one such method, the porous ceramic shape, after formation but prior to firing, is treated by applying to one or more surfaces or areas thereof a ceramic paste or slurry containing a fugitive constituent capable of leaving a small pore when removed during the drying or firing operation. The fugitive constituent can be a sublimable compound or a burnable (e.g., carbonaceous) compound, utilized in a size and an amount which will result in pores having an average diameter smaller than that of the pores which will be present in the body portion or at untreated surfaces. During the firing operation, the ceramic paste or slurry becomes integrally associated with (fused to) the porous body portion.

In another method, surfaces of the mold corresponding to the areas on the part where a smooth surface is desired are treated by application thereto (generally onto the mold release agents already present) of a mixture of ceramic powder and fugitive constituent. The composition is then poured or injected into the mold and, after setting and removal from the mold, will have associated with it at the areas corresponding to the pre-treated mold surfaces, a thin skin of ceramic material which is rendered porous during the firing step. In this embodiment, it is also possible to eliminate use of fugitive constituents by choosing for the ceramic powder ingredients which are more refractory than those of the underlying body portion, such that during firing, the greater refractoriness of these grains prohibits sintering thereby leaving a partially-sintered, i.e., porous, membrane layer on the preselected areas of the body portion.

Among the preferred methods according to the invention involves the application of a ceramic paper (either woven, air-laid, or the like) atop the release agent on the appropriate mold surfaces prior to casting or injection molding the ceramic composition. In this manner, the composition, during foaming, expands into the ceramic paper, thereby laminating or bonding the systems together. On firing, there is developed a porous body portion having on one or more of its surfaces a thin porous ceramic membrane layer by reason of the now integrally-bonded ceramic paper whose pores are on the average smaller than those of the underlying body portion.

In the most preferred methods, formation of a porous ceramic membrane layer is accomplished integral with the formation of the underlying porous body. In situ processing in this manner offers significant advantage in the economics of manufacture of the final ceramic kiln furniture article.

According to one of these preferred methods, the release agent used in the mold, at the appropriate areas, consists of or contains a defoaming surfactant (i.e., a foam suppressor). During the internal development of porosity in the composition in the mold by virtue of gas-generating reactions therein, the defoaming agent acts to sufficiently suppress the reaction to keep the pores at these surfaces controllably small, i.e., smaller than those within the body portion and at surfaces not in contact with the foam suppressor. Since the surfactant is per se a release agent or is associated with a release agent, no problems are encountered in demolding the part. Commonly used surfactants for the defoaming of detergents, paints, varnishes and the like are eminently suitable for this purpose.

According to another such preferred method, there is used, as the release agent per se or along with a release agent, a foam suppressing agent consisting of an organic compound having an unhindered hydroxyl group (i.e., an OH— "tail"), such as common alcohols, polyethylene glycol, polyvinyl alcohol, and the like. By provision of such agents on mold surfaces corresponding to those areas of the body portion where the porous ceramic membrane layer is desired, the hydroxyl group apparently absorbs the outgassing hydrogen molecules at these surfaces, thereby restricting their growth. A porous ceramic membrane is attained by virtue of the underlying foaming reaction and the fact that hydrogen gas bubbles at the desired surfaces are kept small.

In another method applicable to this aluminosilicate system, mold surfaces corresponding to those where a smooth porous ceramic membrane is desired to be formed are provided with a gel accelerating agent, preferably along with a release agent, and most preferably along with a release agent consisting of or containing an OH-tail as above described. The gel accelerating agent serves to locally set the aluminosilicate hydrogel prior to reaction between the particulate metal and alkali compounds in the composition. After removal from the mold of the set ceramic structure, the structure is treated to remove therefrom water and alkali metals (e.g., by leaching), such that at the surfaces where little or no porosity was developed as a result of the accelerated setting of the gel, small pores are developed by means of the water and alkali removal.

Additional methods to achieve localized rapid gelation of the aluminosilicate system at surfaces where a porous ceramic membrane is desired include incorporation of water along with the release agent at the desired mold surfaces, the water being in an amount such that the combined, but not yet set, silicate and aluminate mixture absorbs a sufficient portion of this water to locally dilute the original amounts of soluble silicate and soluble aluminate, thereby locally reducing the gel time at these surfaces as compared to that occurring throughout the remainder of the composition. In another method, it can be arranged that water is locally removed from surfaces where a porous ceramic membrane is desired so as to bring about more rapid gelation of the aluminosilicate system at those areas (by virtue of increased solids concentration). This can be achieved, for example, by treating the corresponding mold surfaces with a hydroscopic release agent (or a release agent composition containing a hydroscopic agent) or by arranging a layer of dry paper at the required mold surface or by localized heating of the required mold surface.

Another method applicable to the aluminosilicate hydrogel system is to bring about a change in pH on the surface where the porous ceramic membrane is required. For example, incorporation of an acidic component in the release agent such as acetic acid or dilute hydrochloric acid will locally accelerate the gelation prior to the onset of foaming.

The invention is further described with reference to the following examples.

EXAMPLE 1

Two slurries were prepared, one containing sodium silicate and the other sodium aluminate. The slurries were prepared to a specific gravity of 2.1 g/cc at a viscosity of 25,000 cps at 70° F.

| Sodium Silicate Slurry | |
| --- | --- |
| sodium silicate grade 50 (44.1% solids) | 27.2% |
| additional process water | 5.4% |
| Dow surfactant 190 | 0.6% |
| silica fume (¼ micron) | 1.6% |
| chopped fibers (⅛ and down) | 2.0% |
| fused cordierite (−200 mesh) | 30.2% |
| calcined kyanite (−200 mesh) | 32.7% |
| powdered aluminum metal (6-9 micron) | 0.3% |
| Sodium Aluminate Slurry | |
| sodium meta-aluminate solution (46% solids) | 25.9% |
| additional water | 5.7% |
| Dow surfactant 190 | 0.6% |
| silica fume (¼ micron) | 1.5% |
| chopped fibers (⅛ and down) | 1.9% |
| fused cordierite (−200 mesh) | 33.9% |
| calcined kyanite (−200 mesh) | 31.0% |

Equal weights (360 g) of the slurries were combined and cast into a mold cavity having an 840 cc capacity (since the slurries had a specific gravity of 2.1 g/cc, only 41% of the mold cavity was filled). The mold was in the form suitable for preparing a 10-inch diameter plate, ⅝-inches thick. One side of the mold surface was coated with a release agent containing 17.5% polyethylene glycol 3350, 12.5% polyvinyl alcohol solution, 36.5% glycerine and 33.5% water. Approximately 30 seconds after the ceramic composition was cast into the mold, the mix began to foam to an open-cell porous structure having a wet density of 0.86 g/cc. Foaming stopped when the sodium aluminosilicate hydrogel binder phase set (approximately 3 to 4 minutes), freezing the expanded structure in place. Adjacent the release agent, the ceramic composition gelled more rapidly, thereby preventing growth of any hydrogen gas bubbles formed near this surface. After 8 to 10 minutes in the mold, the hydrogel developed sufficient strength to be demolded, and the supportable cast shape displayed on excellent smooth skin where it was in contact with the release agent composition.

At this point the part contained 4.5% sodium oxide and 20.1% water at the above mentioned 0.86 g/cc density. In order to increase the refractoriness, the sodium oxide was then removed. This was accomplished by rinsing the part with 10 liters of purified water (deionized water with a 50,000 ohm resistance or better). This rinse reduced the sodium oxide content to approximately 2%, the stoichiometric amount. To remove the remaining sodium, the part was then subjected to 30-40 liters of a 1% ammonium chloride solution whereby all of the $NH_4^+$ ions replaced the $Na^+$ ions. An additional 5 liter water rinse was then performed to remove excess $Cl^-$ ions after which the part was removed and allowed to drain and dry.

After the initial draining and air drying period, the part was heated to 600° F. in 6 hours. The warm part was removed from the oven and placed directly in a kiln. The part was then slowly heated to the required firing temperature of 2425° F. in 10-12 hours. Once at temperature, the part was held for 2 hours to complete the sintering operation before being allowed to furnace cool.

The ceramic article made in this manner had a predominant microstructure of cordierite/mullite, an apparent refractoriness of about 2500° F., a coefficient of thermal expansion of about $1.5 \times 10(-6)$ at 700° C. and $3.2 \times 10(-6)$ at 1000° C., and a room temperature modulus of rupture of about 400–450 psi. After exposure to 100 cycles of room temperature to 1250° C., no significant loss of strength was recorded. The apparent refractoriness of the artile was about 2500° F., and its density was about 0.6 g/cc.

The article so made is excellently suited for use as kiln furniture by reason of its low mass, porosity, refractoriness, resistance to thermal shock, and smooth-skinned surface.

EXAMPLE 2

Utilizing the composition and process set forth in Example 1, but using instead a release agent consisting of 50% water and 50% glycerine, a porous refractory ceramic kiln furniture plate of low density was produced having a smooth skin on one surface thereof by reason of rapid gelation of the aluminosilicate hydrogel in contact with the release agent prior to development of any large bubbles.

EXAMPLE 3

Utilizing the composition and process set forth in Example 1, but coating one of the mold surfaces with a thin layer of woven mullite fibered paper (instead of using the release agent composition of Example 1), the part removed from the mold was found to have the woven paper significantly attached to its surface such that no separation occurred during subsequent sodium removal processing. Upon firing, there was produced a low density porous ceramic refractory kiln furniture article having a smooth skin on one of its surfaces.

EXAMPLE 4

The same composition and process set forth in Example 1 was employed with the exception that a silicone release agent modified with a silicone defoaming surfactant was sprayed on one of the mold surfaces, and that mold surface was locally heated to about 140°-150° F., while the other mold surface was kept at room temperature. As a consequence of accelerated gelation of the hydrogel in contact with the heated surface insufficient time was available for the foam cells to grow to any appreciable size before setting occurred. The result was a smooth surface on the kiln furniture article after firing.

Having described the invention with reference to particular compositions, processes, examples and embodiments, it is to be understood that these particulars are presented for purposes of illustration and description, and are not otherwise intended as strict limitations upon the scope of the fundamental invention as defined in the appended claims.

What is claimed is:

1. Kiln furniture for supporting ceramic ware during the firing thereof, comprised of a porous, low-density, refractory ceramic body having on one or more surfaces thereof an integral smooth skin in the form of a thin porous ceramic membrane layer, the pores of which are of an average size smaller than those of said body portion and remaining surfaces, said ceramic body being formed from the firing of a porous molded aluminosilicate-bound aggregate of refractory ceramic materials which has been treated prior to firing to reduce the alkali metal content thereof.

2. Kiln furniture according to claim 1 wherein said porous molded aluminosilicate-bound aggregate of refractory ceramic materials is formed by placing into a mold of suitable configuration a foamable aqueous composition comprised of alkali metal silicate, alkali metal aluminate, refractory ceramic materials, metal powder, gel strengthening agent and surfactant, whereby in said mold, the alkali metal silicate and alkali metal aluminate react to form an aluminosilicate hydrogel binder while reaction occurs between and among ingredients in said composite on to generate hydrogen gas so as to bring about formation of pores within said hydrogel-bound structure.

3. Kiln furniture according to claim 1 wherein said porous body has a predominantly open-celled pore structure.

4. Kiln furniture according to claim 1 wherein said porous body has a predominantly closed-celled pore structure.

5. Kiln furniture according to claim 3 or 4 wherein said thin porous ceramic membrane layer has a predominantly open-celled pore structure.

6. Kiln furniture according to claim 3 or 4 wherein said thin porous ceramic membrane layer has a predominantly closed pore structure.

7. A process for producing a low density kiln furniture article, comprising the steps of:
 (a) providing a foamable ceramic composition comprised of an aqueous admixture of effective amounts of alkali metal silicate, alkali metal aluminate, refractory ceramic materials, gel strengthening agent, surfactant, and metal powder;
 (b) molding said composition into a desired configuration in a mold or extrusion chamber;
 c) permitting said composition to remain in said mold or chamber for a period of time during which said alkali metal silicate and said alkali metal aluminate react to form an aluminosilicate hydrogel which binds all components in a supportable shape corresponding to said mold or chamber and during which porosity develops within said supportable shape by reason of evolution of hydrogen in said composition;
 (d) removing said supportable shape from said mold or chamber;
 (e) treating said supportable shape to substantially reduce the alkali metal content thereof; and
 (f) firing said supportable shape to form ceramic bonds therein and to produce a refractory porous ceramic kiln furniture article, wherein there is further provided on one or more surfaces of said article a thin porous ceramic membrane layer whose pores have an average diameter less than that of the pores within and at other surfaces of said article.

* * * * *